United States Patent
Hasegawa (10) Patent No.: US 11,379,165 B2
(45) Date of Patent: Jul. 5, 2022

(54) IMAGE FORMING APPARATUS AND METHOD OF CONTROLLING IMAGE FORMING APPARATUS FOR EXECUTING NOTIFICATION PROCESSING OF NOTIFYING A STORAGE OF AN AREA

(71) Applicant: CANON KABUSHIKI KAISHA, Tokyo (JP)

(72) Inventor: Yuya Hasegawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/109,847

(22) Filed: Dec. 2, 2020

(65) Prior Publication Data

US 2021/0173594 A1    Jun. 10, 2021

(30) Foreign Application Priority Data

Dec. 5, 2019  (JP) .............................. JP2019-220763

(51) Int. Cl.
*G06F 3/12* (2006.01)
*G06K 15/02* (2006.01)

(52) U.S. Cl.
CPC ............ *G06F 3/122* (2013.01); *G06F 3/1242* (2013.01); *G06F 3/1256* (2013.01); *G06K 15/1869* (2013.01); *G06K 15/1886* (2013.01)

(58) Field of Classification Search
CPC ...... G06F 3/122; G06F 3/1242; G06F 3/1256; G06F 12/02; G06K 15/1869; G06K 15/1886; G06K 15/1817; H04N 1/00
See application file for complete search history.

(56) References Cited

U.S. PATENT DOCUMENTS

| | | | |
|---|---|---|---|
| 2001/0019191 A1* | 9/2001 | Yoshie | B65H 29/46 270/52.17 |
| 2003/0044186 A1* | 3/2003 | Kato | G03G 15/6538 399/16 |
| 2007/0065203 A1* | 3/2007 | Kikuchi | G03G 15/6582 399/407 |
| 2009/0237706 A1* | 9/2009 | Miyajima | G03G 15/2039 358/1.14 |
| 2016/0070510 A1* | 3/2016 | Iwase | G06F 3/1238 358/1.14 |
| 2016/0352936 A1* | 12/2016 | Kanbayashi | G06F 3/1256 |
| 2017/0155792 A1* | 6/2017 | Mizude | G06K 9/00463 |
| 2019/0113873 A1* | 4/2019 | Wakabayashi | G03G 15/6523 |

FOREIGN PATENT DOCUMENTS

JP        2015141681 A        8/2015

* cited by examiner

*Primary Examiner* — Juan M Guillermety
(74) *Attorney, Agent, or Firm* — Canon U.S.A., Inc. IP Division

(57) ABSTRACT

An image forming apparatus includes a sensor configured to detect an original, a nonvolatile storage that includes a semiconductor area, a setting unit configured to execute a setting for dividing the semiconductor area into a plurality of areas, and a controller configured to execute Trim processing on the divided areas in response to passing of a predetermined time period while the image forming apparatus is in a standby state. The controller is configured to stop the Trim processing based on a detection of the original detected by the sensor while the Trim processing is executed.

20 Claims, 9 Drawing Sheets

IMAGE FORMING APPARATUS AND METHOD OF CONTROLLING IMAGE FORMING APPARATUS FOR EXECUTING NOTIFICATION PROCESSING OF NOTIFYING A STORAGE OF AN AREA

BACKGROUND OF THE DISCLOSURE

Field of the Disclosure

The aspect of the embodiments relates to an image forming apparatus and a method of controlling the image forming apparatus.

Description of the Related Art

There are semiconductor storage devices, each including a flash memory and a control circuit, used for an embedded device. Examples of the flash memory include a solid state drive (SSD) and an embedded Multi Media Card (eMMC). Such a semiconductor storage device has better performance, for example, in access speed and quietness than a hard disk drive (HDD). On the other hand, the number of times that data is rewritable to such a semiconductor storage device is limited.

Thus, a controller of a semiconductor storage device performs distribution data writing referred to as wear leveling to increase a life of flash memory built in the semiconductor storage device. In the wear leveling, data writing is performed into different blocks so as to use blocks with the smaller number of writing times, as much as possible. Accordingly, when wear leveling processing is executed in the semiconductor storage device, block erasing and data copying occur during block changing. Therefore, performance (reading and writing performance) of the semiconductor storage device may decrease.

In a nonvolatile semiconductor storage device, processing referred to as TRIM is generally executed as a method of improving the decrease in performance. The TRIM is a command that notifies a storage device of storage areas that become unnecessary for a file system of an operating system (OS).

More specifically, a command referred to as TRIM is used to notify a controller of a semiconductor storage device of areas that become unused. Since the controller of the semiconductor storage device recognizes the unused areas, the controller collects only areas that are being used (garbage collection), and performs wear leveling. Thus, an amount of copied data decreases, the number of used blocks decreases, and the total number of times of data writing decreases. As a result, since a TRIM command notifies a semiconductor storage device of storage areas that become unnecessary, wear leveling processing does not need to be performed for unnecessary areas, and performance of the semiconductor storage device less decreases.

As an example of a timing at which Trim processing is executed with a TRIM command, an image forming apparatus obtains a job status of a print job, and executes a TRIM command that can be used for wear leveling if the image forming apparatus determines that the job status is in a status that represents an interruption of the print job, which is discussed in Japanese Patent Application Laid-Open No. 2015-141681.

SUMMARY OF THE DISCLOSURE

According to an aspect of the embodiments, an image forming apparatus includes a sensor configured to detect an original, a nonvolatile storage that includes a semiconductor area, and a controller configured to execute a setting for dividing the semiconductor area into a plurality of areas, and execute Trim processing on the divided areas in response to passing of a predetermined time period while the image forming apparatus is in a standby state, wherein the controller is configured to stop the Trim processing based on a detection of the original detected by the sensor while the Trim processing is executed.

Further features of the disclosure will become apparent from the following description of exemplary embodiments with reference to the attached drawings.

DESCRIPTION OF THE EMBODIMENTS

Exemplary embodiments of the disclosure will be described with reference to the accompanying drawings. The exemplary embodiments described below is not intended to limit the disclosure according to the claims. Further, all combinations of features described in the exemplary embodiments are not necessarily essential to solution means of the disclosure.

Figure 1:
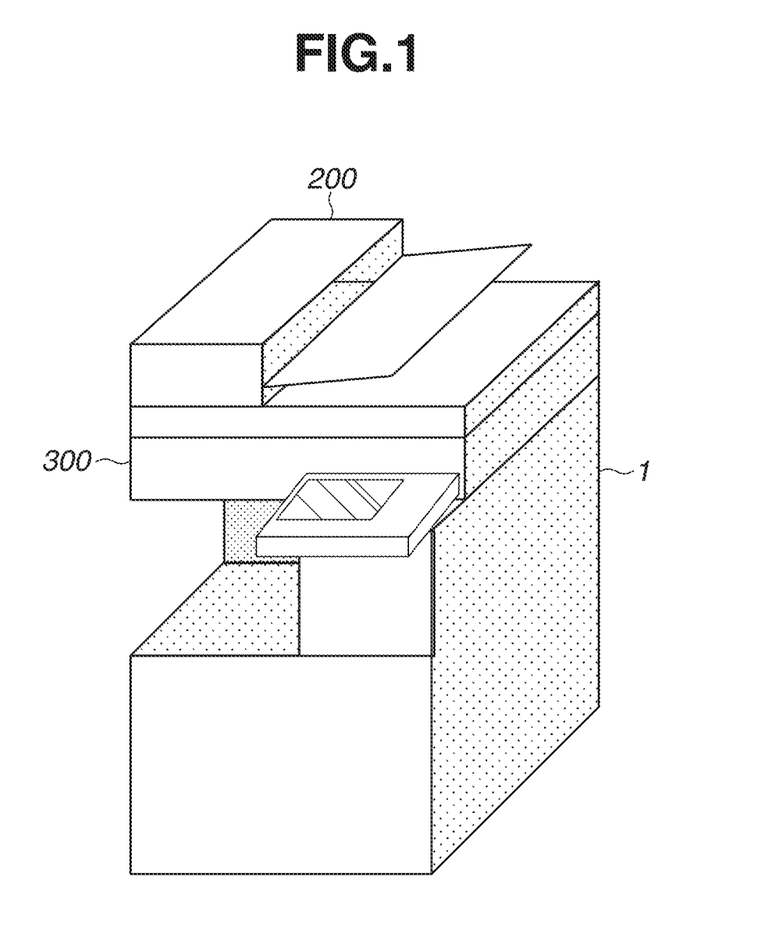
FIG. 1 is a schematic diagram illustrating an entire image forming apparatus.

FIG. 1 is a schematic diagram illustrating an entire image forming apparatus to which an exemplary embodiment of the disclosure is applied. An image forming apparatus 1 is, for example, a printer or a multi functional peripheral (MFP) that includes a plurality of functions, such as a copying function and a facsimile function. The image forming apparatus 1 includes an automatic document feeder (ADF) 200 and a reading unit 300 at an upper portion of the image forming apparatus 1. The ADF 200 and the reading unit 300 are used to read originals.

Figure 2:
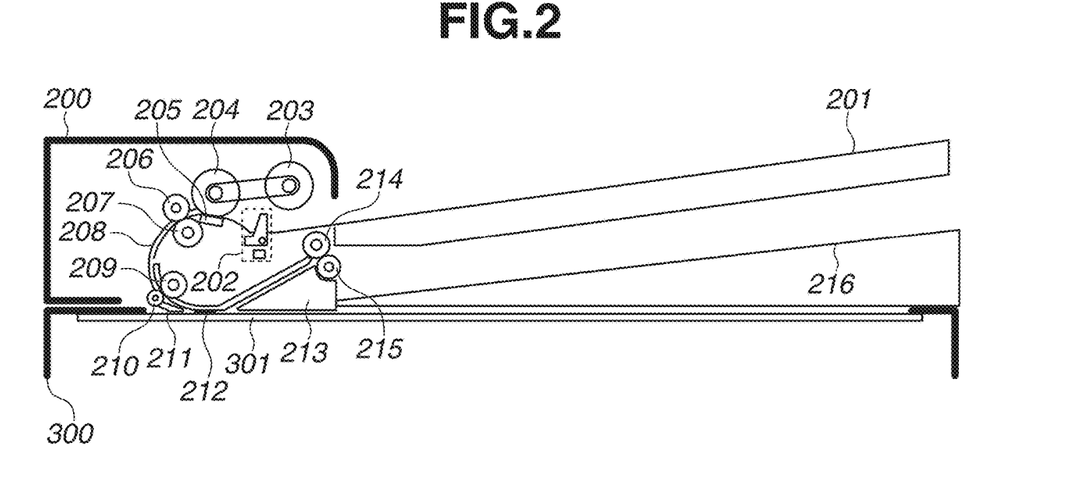
FIG. 2 is a cross-sectional diagram schematically illustrating a configuration of an automatic document feeder (ADF).

FIG. 2 is a cross-sectional diagram schematically illustrating a configuration of the ADF 200.

The ADF 200 includes an original tray 201 on which originals are loaded, an original detection sensor 202, and a mechanism (203 to 216) that pulls into originals and reads images one by one. The ADF 200 also includes a discharge tray 216 that stores originals whose images have been read. The original detection sensor 202 will be described in detail below. Hereinafter, the mechanism (203 to 216) that pulls into originals one by one and read images will be described in detail.

A pickup roller 203 that pulls an original into the ADF 200 is configured to be lowered to a position where the pickup roller 203 is in contact with an original (the pickup roller 203 that is lowered is not illustrated). A mechanism that conveys originals includes a separation pad 205 and a separation roller 204. The separation roller 204 opposes and always contacts the separation pad 205. The separation roller 204 separates one top original from an original bundle by using friction, and to convey the top original.

The original separated by the separation roller 204 is conveyed toward a bottom of the ADF 200 by a first conveyance roller 206 and a driven conveyance roller 207, and an inner guide 208 that guides the conveyance. The original conveyed to the bottom is conveyed to an original reading position 212 by a before-scanning roller 209 and a driven pressing roller 210. A guide mylar 211 guides the original to the original reading position 212.

When the original comes into contact with a platen glass 301 at the original reading position 212, an image sensor (not illustrated) located under the platen glass 301 reads an image. The original whose image has been scanned passes through a discharge guide 213 to a discharge roller 214 and a driven discharge roller 215, and is discharged to the discharge tray 216.

Figure 3A:
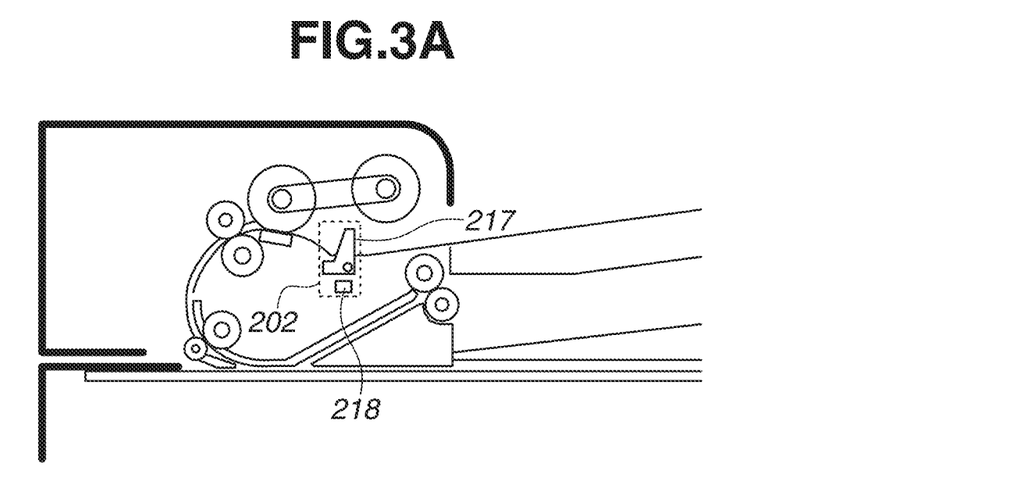
FIGS. 3A and 3B are diagrams illustrating an original detection sensor.
Figure 3B:
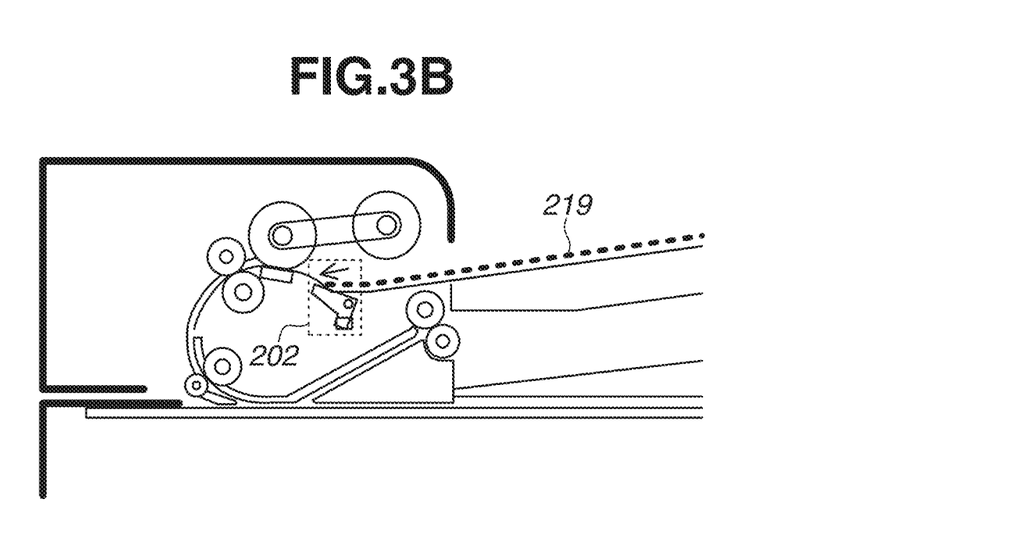

FIGS. 3A and 3B are cross-sectional diagram schematically illustrating a configuration of the original detection sensor 202. Operations of the original detection sensor 202 that detects whether an original bundle is loaded onto the ADF 200 will be described with reference to FIGS. 3A and 3B. The original detection sensor 202 includes a movable flag 217 and a photointerrupter 218.

FIG. 3A illustrates the original tray 201 of the ADF 200 without an original bundle loaded. FIG. 3B illustrates the original tray 201 of the ADF 200 with an original bundle loaded. A dotted line in FIG. 3B represents an original bundle 219.

If the original bundle 219 is loaded onto the original tray 201, the movable flag 217 moves from a state in FIG. 3A to a state in FIG. 3B, and comes between a light emitter and a light receiver of the photointerrupter 218. Consequently, light that has been received by the light receiver does not reach the light receiver, and a signal output from the photointerrupter 218 changes. In this way, it is detected that the original bundle 219 has been loaded.

Figure 4A:
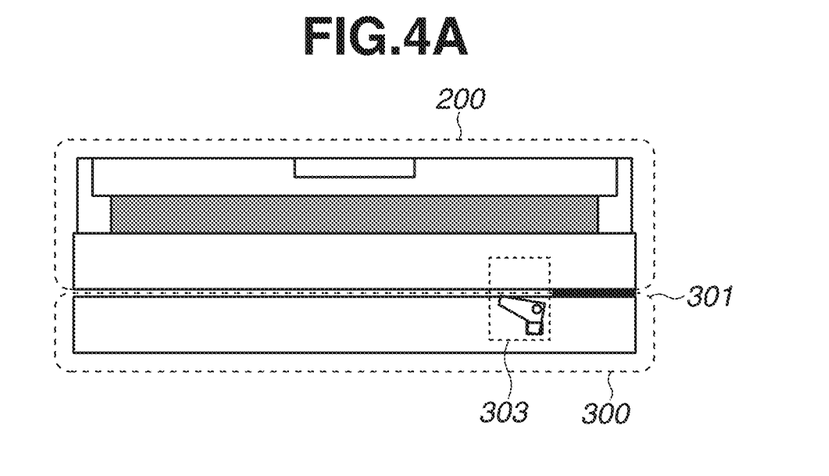
FIGS. 4A and 4B are diagrams illustrating the ADF and a reading unit of the image forming apparatus, seen from a side.
Figure 4B:
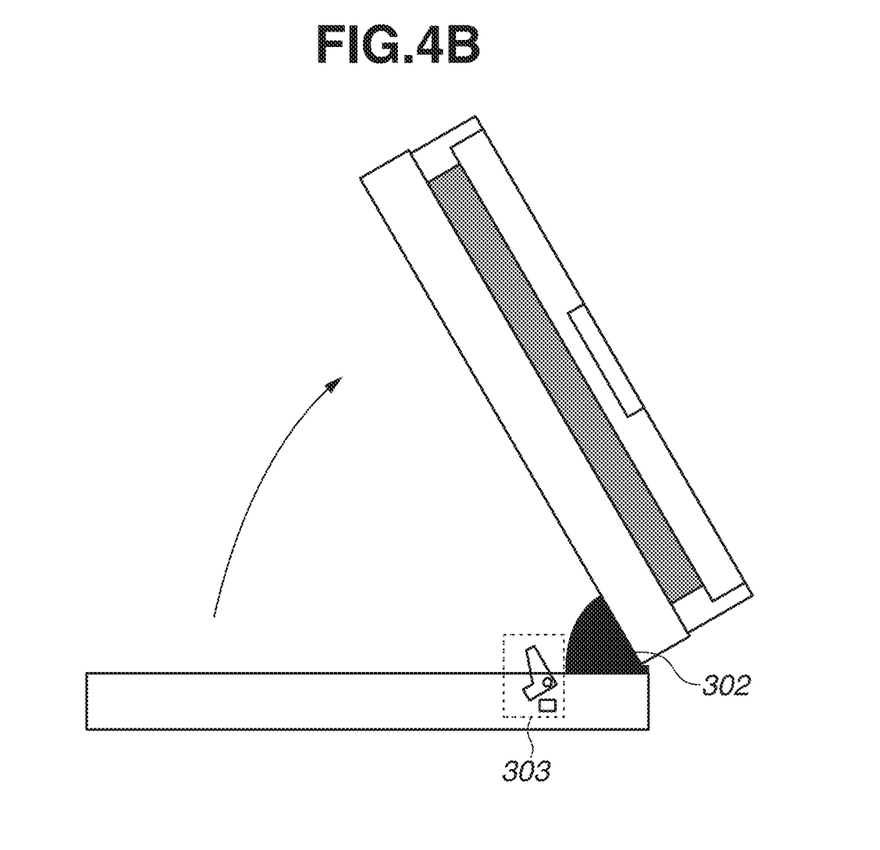

FIGS. 4A and 4B are side views with the ADF 200 and the reading unit 300 of the image forming apparatus 1 illustrated in FIG. 1 being seen from the right. The ADF 200 also functions as a pressing plate (pressing member) that presses an original placed on the platen glass 301 against the platen glass 301. FIG. 4A illustrates a state in which the ADF 200 is closed to press an original against the platen glass 301. To place an original on the platen glass 301, the ADF 200 is turned upward about a hinge 302 as a pivot. FIG. 4B illustrates the ADF 200 in an open state.

In FIGS. 4A and 4B, a pressing-plate opening/closing sensor 303 includes a photointerrupter and a movable flag, similar to the original detection sensor 202 illustrated in FIGS. 3A and 3B. The pressing-plate opening/closing sensor 303 is configured so as to change a state of an output signal by opening or closing the ADF 200.

Figure 5:
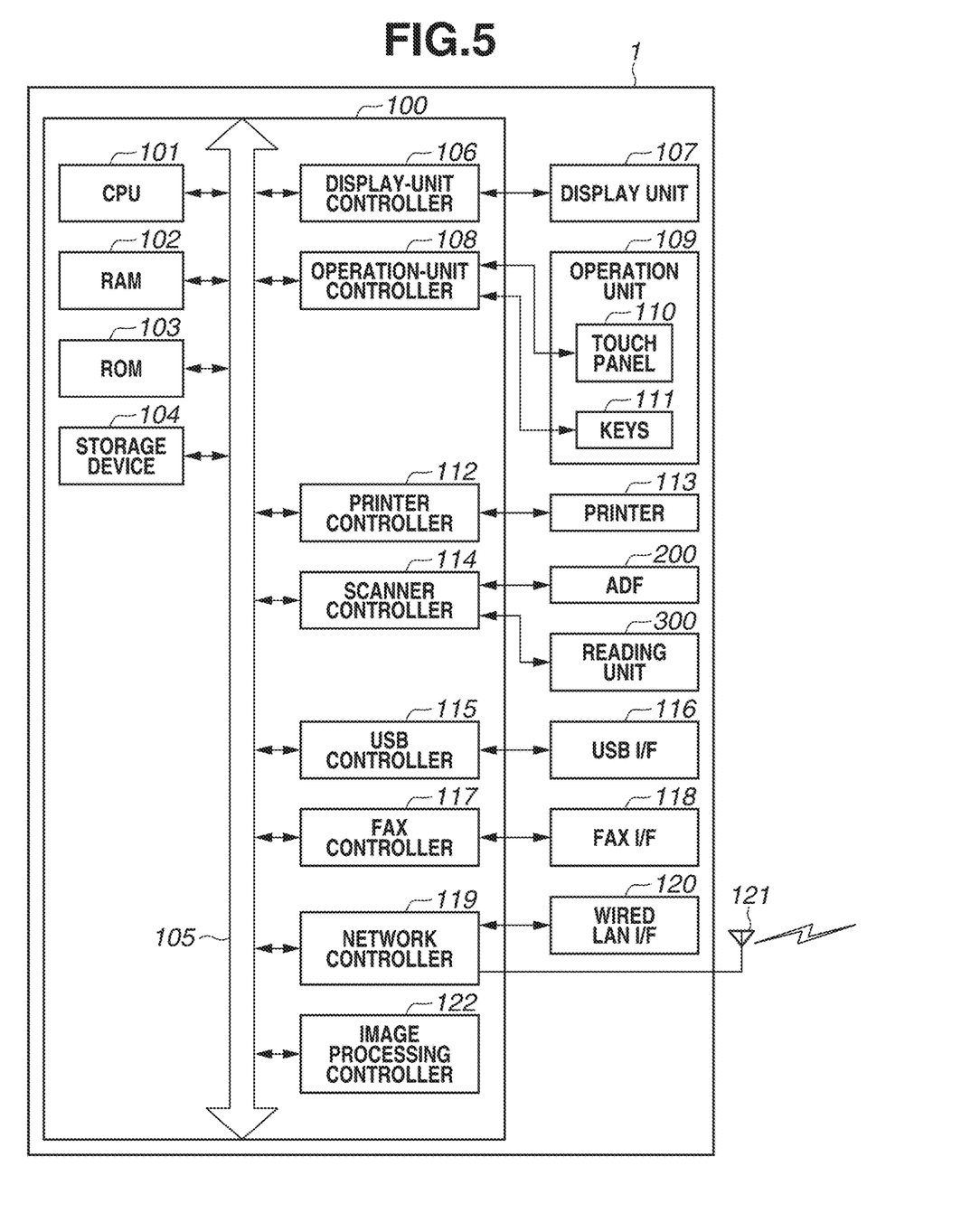
FIG. 5 is a block diagram illustrating a hardware configuration of the image forming apparatus.

FIG. 5 is a block diagram illustrating a hardware configuration of the image forming apparatus 1.

The image forming apparatus 1 includes a controller 100, a display unit 107, an operation unit 109, a printer 113, a universal serial bus (USB) interface (I/F) 116, a facsimile (FAX) I/F 118, a wired local area network (LAN) I/F 120, a wireless LAN antenna 121, the ADF 200, and the reading unit 300.

The controller 100 includes a central processing unit (CPU) 101, a random access memory (RAM) 102, a read only memory (ROM) 103, a storage device 104, a system bus 105, a display-unit controller 106, an operation-unit controller 108, and a printer controller 112. The controller 100 also includes a scanner controller 114, a USB controller 115, a FAX controller 117, a network controller 119, and an image processing controller 122. The operation unit 109 includes a touch panel 110 and keys 111.

The CPU 101 is a central processing unit that controls the image forming apparatus 1. The CPU 101 is connected with each of the units through the system bus 105. The RAM 102 is a work memory used to allow the CPU 101 to operate. The RAM 102 is used to load various programs thereinto, store arithmetic processing results, and store image data obtained by operations, such as printing and scanning, and is processed by the image processing controller 122. The ROM 103 is a memory that stores, for example, a start-up program for the CPU 101, and various setting information.

The storage device 104 includes a NAND nonvolatile memory (flash memory) used to store programs and data that have large sizes. In the present exemplary embodiment, the storage device 104 is an embedded Multi Media Card (eMMC). However, the nonvolatile memory is not limited to the eMMC. The nonvolatile memory may be a solid state drive (SSD), or another nonvolatile memory device.

The display-unit controller 106 displays display information for the display unit 107. For example, the display-unit controller 106 transmits image data to the display unit 107 according to a communication protocol of the display unit 107. The display unit 107 includes a function that displays graphic information received from the display-unit controller 106 on a screen, such as a liquid crystal display (LCD), and includes a backlight that allows a user to see display content on the screen. The operation-unit controller 108 receives input from the touch panel 110 and the keys 111, and converts the input into data that can be understood by the CPU 101.

To print image data specified by the CPU 101, the printer controller 112 controls various devices involved in print operations of the printer 113. The various devices include, for example, a photoconductive drum, a laser oscillator, and a toner fixing unit. The scanner controller 114 controls loads such as sensors and motors related to reading operations of the ADF 200 and the reading unit 300, and controls various devices, such as the original detection sensor 202 and the pressing-plate opening/closing sensor 303.

The scanner controller 114 transfers original data obtained by reading an original to the CPU 101 and the image processing controller 122. The scanner controller 114 also notifies the CPU 101 of results obtained by the original detection sensor 202 and the pressing-plate opening/closing sensor 303.

The USB controller 115 connects the USB OF 116 with an external terminal through a USB cable to communicate, for example, image data. The FAX controller 117 connects the FAX OF 118 with a public telephone network through a phone cable to communicate, for example, image data. The network controller 119 connects the wired LAN OF 120 with an external terminal through a LAN cable to perform network communication.

The network controller 119 also transmits and receives data to and from an external terminal wirelessly through the wireless LAN antenna 121. The image processing controller 122 executes image processing. The image processing includes converting original data received from the scanner controller 114 into image data, enlargement, reduction, and color to grayscale conversion, and converting the image data to the image data printable by the printer 113.

Figure 6:
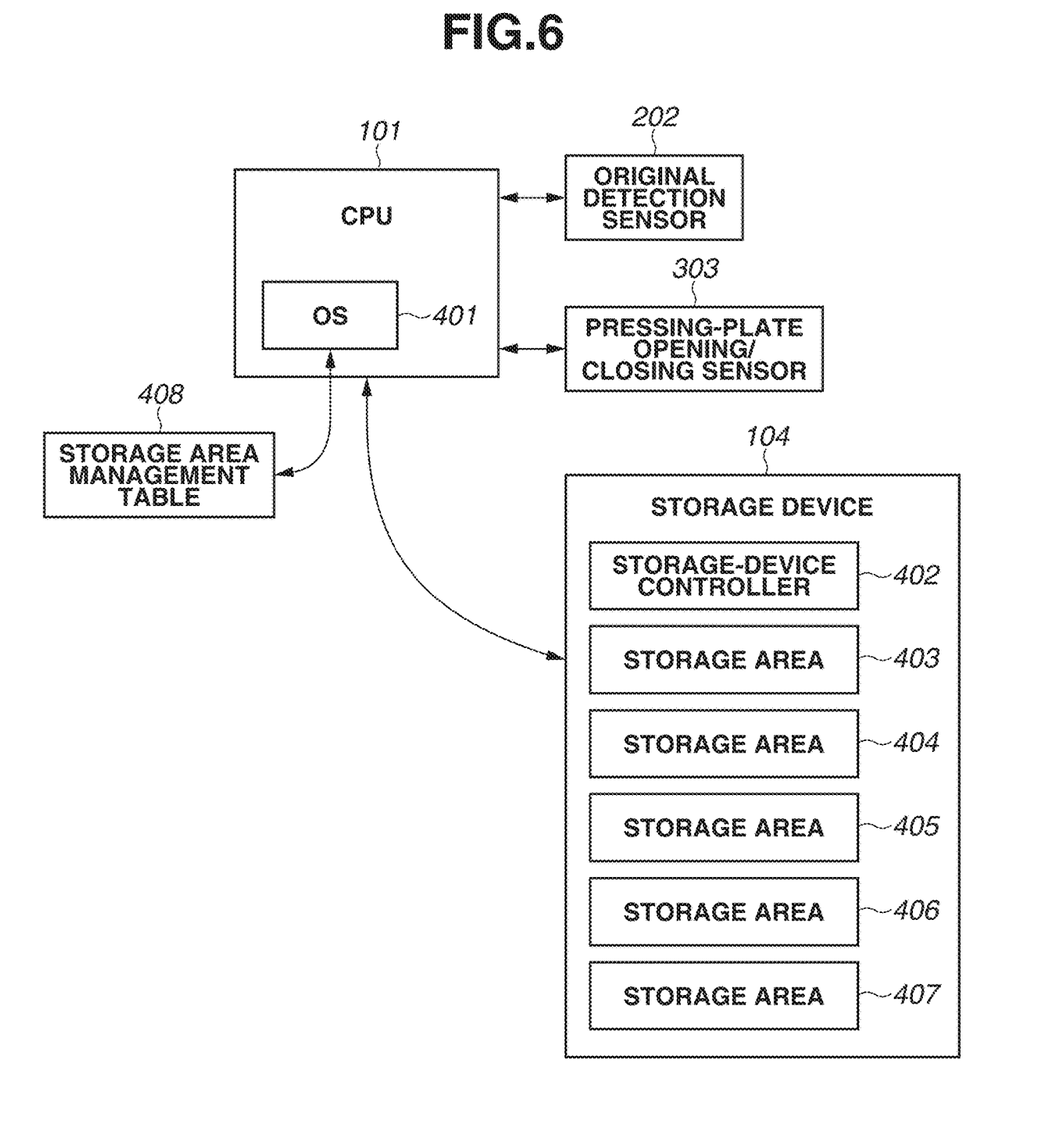
FIG. 6 is a block diagram illustrating processing performed between a central processing unit (CPU), a storage device, a scanner controller, the original detection sensor, and a pressing-plate opening/closing sensor.

FIG. 6 is a block diagram illustrating processing performed between the CPU 101, the storage device 104, the scanner controller 114, the original detection sensor 202, and the pressing-plate opening/closing sensor 303. To simplify FIG. 6, FIG. 6 does not illustrate the system bus 105 that connects the blocks with each other, and the scanner controller 114.

The controller 100 operates an operating system (OS) 401 by the operation of CPU 101. The OS 401 controls and manages entire software and hardware. The OS 401 is basic software commonly used by many applications. A function of reading and writing data from and to the storage device 104 is also based on the OS 401.

For example, if an application that operates on the OS 401 reads data from the storage device 104, the OS 401 causes the CPU 101 to issue a data reading command to the storage device 104. The storage device 104 that has received the data reading command operates a storage-device controller 402 within the storage device 104 to obtain data requested by the data reading command from a storage area within the storage device 104 and transfer the obtained data to the CPU 101. Similarly, if data is written in the storage device 104, the OS 401 causes the CPU 101 to issue a data writing command to the storage device 104. The storage device 104 that has received the data writing command operates the storage-device controller 402 within the storage device 104 to write data requested by the data writing command to the storage area within the storage device 104.

The OS 401 divides the storage area within the storage device 104 into a plurality of areas, and manages the plurality of areas. Consequently, when a plurality of applications writes data to the storage device 104, different applications are not allowed to write storage areas that overlap each other. In this way, necessary data is not deleted. More specifically, a higher limit and a lower limit to be accessible are provided for address values of a semiconductor area (hereinafter, the storage area) within the storage device 104. Ranges of the address values do not overlap each other between the applications. The upper limit and the lower limit of address values may be defined as a start address of an accessible storage area and a data amount from the start address.

Alternatively, the OS 401 may have fixed values for ranges of the address values that each of the applications can access as a table. Alternatively, the OS 401 may have ranges of the address values that each of the applications can access, as variable values in a file management system of the OS 401. The variable values vary depending on, for example, an operation rate of each of the applications. The file management system of the OS 401 is not illustrated. In the present exemplary embodiment, suppose that the storage area within the storage device 104 is divided into five storage areas 403 to 407. The OS 401 holds fixed values of an upper limit and a lower limit of a range of address values of each of the divided storage areas (divided areas), and a TRIM execution flag of each of the storage areas, as a storage area management table 408. The TRIM execution flag will be described below.

When the storage-device controller 402 writes data to the storage device 104, the storage-device controller 402 checks whether data exists in an area selected by a data writing command before the storage-device controller 402 writes data to the area. If data does not exist, the storage-device controller 402 writes data to the selected storage area. However, the number of times that data is rewritable to each of data cells of flash memory, such as the storage device 104, is limited. For this reason, the storage-device controller 402 performs distribution data writing referred to as wear leveling to increase a life of a flash memory built in the storage device 104.

In the wear leveling, different storage blocks are used so as to perform data writing in storage blocks with the smaller number of times of writing, as much as possible. As a result, when wear leveling processing is executed in the storage device 104, block erasing and data copying occur during block rearrangement. As a result, performance (reading and writing performance) of the storage device 104 may decrease. Processing referred to as TRIM (Trim processing) is generally performed to avoid the decrease.

The TRIM is a command that notifies the storage device 104 of storage blocks that become unnecessary for a file system of the OS 401. More specifically, a command referred to as TRIM is used to notify a controller of a semiconductor storage device of areas that become unused. Since the storage-device controller 402 recognizes the unused areas, the storage-device controller 402 needs to collect only blocks that are being used (garbage collection), and performs wear leveling. Thus, an amount of copying data decreases, the number of used blocks decreases, and the total number of times of data writing decreases. As a result, since a TRIM command notifies the storage device 104 of storage blocks that become unnecessary, the wear leveling processing does not need to be performed for unnecessary areas, and performance of the storage device 104 less decreases.

However, if the TRIM command is issued, notification of the storage areas that become unnecessary occupies the CPU 101, and other applications on the OS 401 do not operate smoothly.

For example, if an application controls the printer controller 112 or the scanner controller 114 to cause the image forming apparatus 1 to execute a job operation, such as printing or scanning, the image forming apparatus 1 interrupts the job since a TRIM command occupies the CPU 101.

Alternatively, if, due to a user operation, an application controls the display-unit controller 106, the CPU 101 is occupied, and thus operations, such as screen transition, of the display unit 107 stop. As described above, if TRIM is executed while a user operates the display unit 107, the user may wrongly think that the image forming apparatus 1 malfunctions.

Therefore, in the present exemplary embodiment, a TRIM command is issued after a predetermined time period passes from a time at which the image forming apparatus 1 shifts to a standby mode after a job is completed. The standby mode is a state in which initial settings for hardware in the image forming apparatus 1 and software has been completed after the image forming apparatus 1 is turned on. Alternatively, the standby mode is a state in which after a job is completed, a next job can be received from a user (a state in which a next job can be executed).

The standby mode is a state in which at least power necessary for the CPU 101 and the storage device 104 to operate is supplied and the initial settings have been completed. Thus, part or all of power supply to each of the blocks of the image forming apparatus 1 may be stopped in the standby mode as long as the reception and execution of jobs are not influenced.

If it takes a time to execute initial setting for the scanner controller 114, power supply to part of the ADF 200 and the reading unit 300 that do not need initial setting may be stopped while power is supplied to the scanner controller 114. Alternatively, a backlight of the display unit 107, for example, may be turned off to decrease power consumption of the display unit 107, or the backlight may be turned on.

Operation modes of the image forming apparatus 1 also include a sleep mode. Power consumption of the image forming apparatus 1 in the sleep mode is smaller than that in the standby mode.

In the sleep mode, the whole or part of modules, such as the display unit 107, the printer controller 112, and the printer 113, are stopped, and part of operations in the CPU 101 is stopped to decrease power consumption of the image forming apparatus 1.

Even if a TRIM command is issued in a time period (state) during which a user does not operate the image forming apparatus 1, a time period in which the CPU 101 is occupied becomes long if a target of the TRIM command is all areas of the storage device 104. A time period necessary for TRIM depends on a capacity of the storage device 104. However, it may take several tens of seconds for an embedded Multi Media Card (eMMC) of several gigabytes (GB). It may take a longer time for a solid state drive (SSD).

In this case, a condition under which a TRIM command is issued is limited to a time at which a user operation is not influenced even if a time period in which the CPU 101 is occupied is long. Thus, a TRIM command is difficult to issue. To avoid this situation, it is desirable that TRIM commands are separately and sequentially issued to divided storage areas within the storage device 104. In this way, a time period in which one TRIM command occupies the CPU 101 becomes shorter. A condition under which a TRIM command is issued is relieved.

A time period necessary for executing one TRIM command depends on a data capacity value per divided storage area. Thus, smaller divided storage areas shorten a time period in which the CPU 101 is occupied. Preferably, a storage area is divided to make a time period in which the CPU 101 processes one TRIM command become a time period that does not impose a burden on a user (e.g., approximately seven seconds).

Further, for example, if TRIM commands for the storage area 403 and the storage area 404 within the storage device 104 are to be issued, the CPU 101 issues a TRIM command for the storage area 403 first. After the TRIM operation is completed, the CPU 101 issues a TRIM command for the storage area 404.

In the present exemplary embodiment, a method is described in which the original detection sensor 202 and/or the pressing-plate opening/closing sensor 303 are used as a method of determining whether the image forming apparatus 1 is in a time period (state) in which a user does not operate the image forming apparatus 1.

The state in which a user does not operate the image forming apparatus 1 is, for example, a state in which an original is not loaded onto the ADF 200 for a copy job or a print job. The state in which a user does not operate the image forming apparatus 1 is, for example, a state in which the pressing-plate opening/closing sensor 303 detects that the ADF 200 is closed relative to the platen glass 301. The time period is defined as a non-operation time period.

On the other hand, a time period (state) in which a user operates the image forming apparatus 1 is, for example, a state in which an original is loaded onto the ADF 200 for a copy job or a print job. The state in which a user operates the image forming apparatus 1 is, for example, a state in which the pressing-plate opening/closing sensor 303 detects that the ADF 200 is opened relative to the platen glass 301 (is apart from the platen glass 301). The time period is defined as an operation time period.

On the other hand, a case in which an original is placed on the ADF 200 of the image forming apparatus 1, or a case in which the ADF 200 is opened to place an original on the reading unit 300 is defined as a user operation time period. Executing no TRIM operation in the user operation time period avoids giving an unnecessary misunderstanding to a user.

For example, the OS 401 executes a TRIM operation as described below. First, the image forming apparatus 1 that does not execute a job in the standby state checks whether it is a user non-operation time period by using the original detection sensor 202 and/or the pressing-plate opening/closing sensor 303 a time period in which a user does not perform operation. Then a TRIM command is sequentially issued to the storage areas 403, 404, 405, 406, and 407 within the storage device 104 that have been preliminarily selected.

Figure 7:
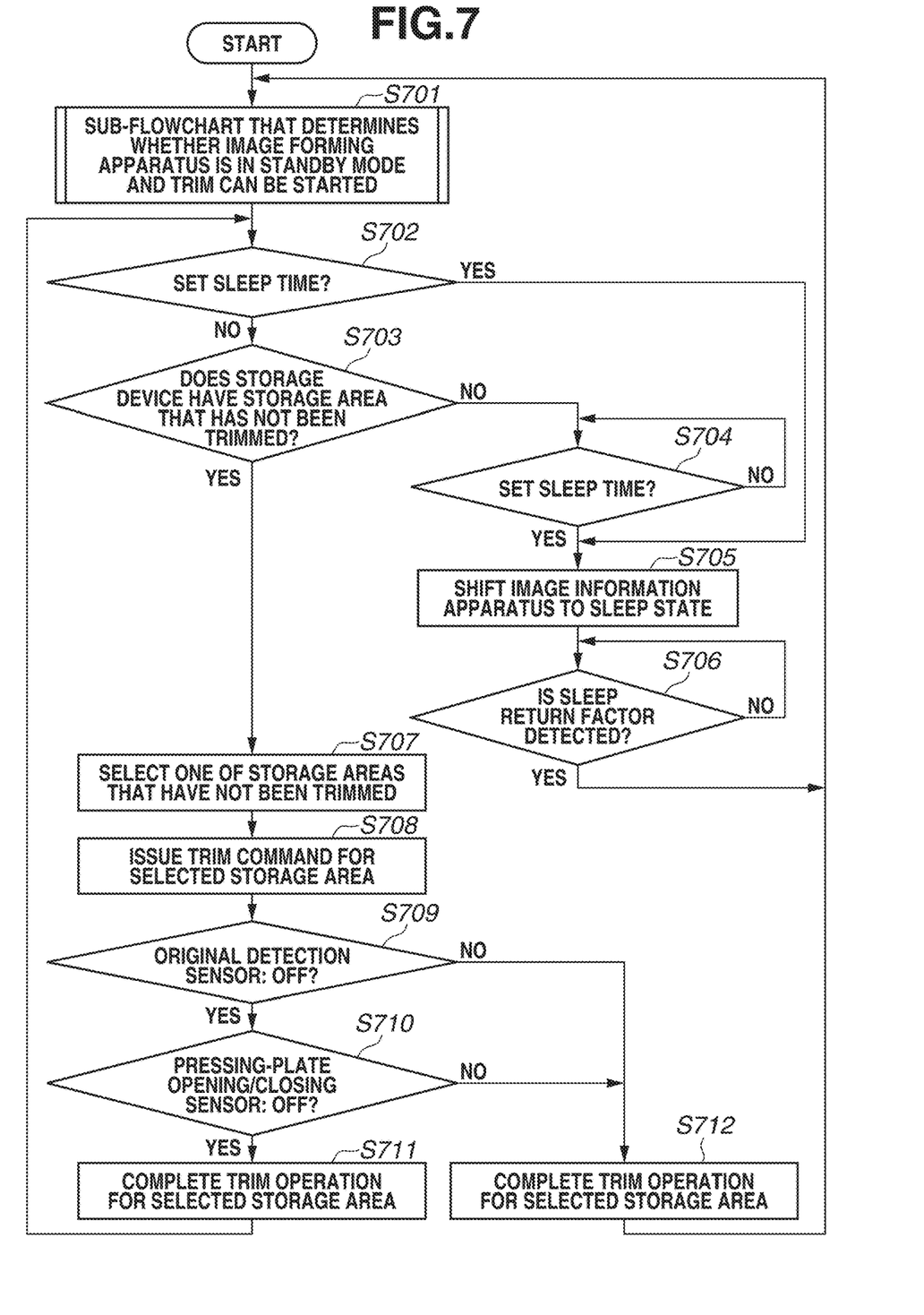
FIG. 7 is a flowchart illustrating processing performed when the image forming apparatus executes a TRIM operation.

FIG. 7 is a flowchart performed when the image forming apparatus 1 executes a TRIM operation. The flowchart starts when the image forming apparatus 1 is turned on, and shifts to the standby state. In the present exemplary embodiment, suppose that a TRIM execution flag of each of the storage areas that is stored in the storage area management table 408 is Low (not executed). For example, if all the TRIM execution flags are High, TRIM has been executed for all the storage areas within the storage device 104, and further execution of TRIM is not needed.

First, in step S701, a sub-process is executed. The sub-process checks a state of the image forming apparatus 1, and determines whether the image forming apparatus 1 is in a user non-operation time period. The sub-process will be described in detail with reference to FIG. 8.

Figure 8:
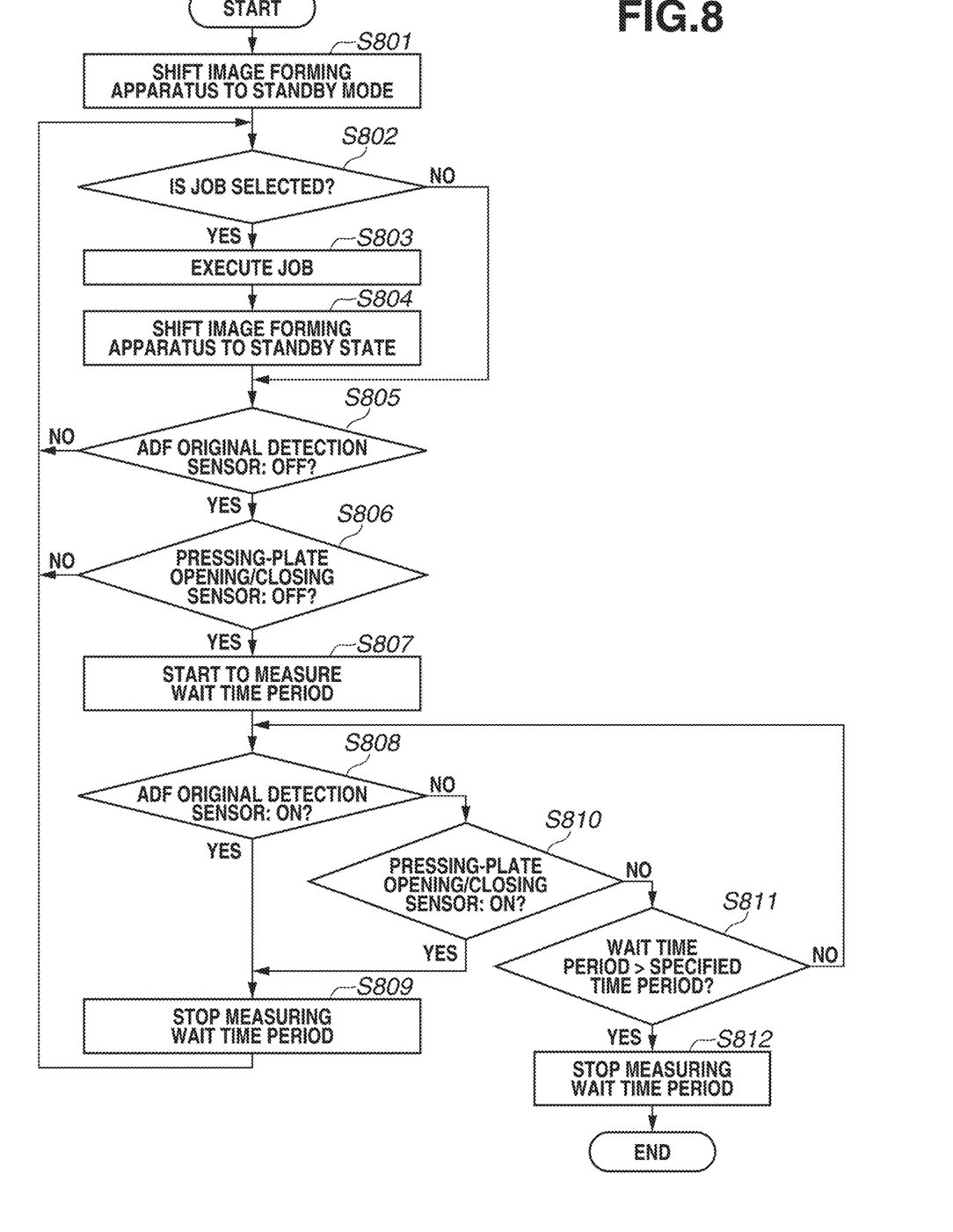
FIG. 8 is a flowchart illustrating processing performed in sub-process S701.

FIG. 8 is a flowchart illustrating a flow performed in sub-process S701 in FIG. 7. First, in step S801, the image forming apparatus 1 is shifted to the standby mode. In step S802, it is determined whether a job is selected for the image forming apparatus 1. If a job is selected (Yes, in step S802), the selected job is executed in step S803. After the job is completed, the image forming apparatus 1 is shifted to the standby state in step S804, and a state of the original detection sensor 202 is checked in step S805. If a job is not selected in step S802 (NO in step S802), the processing proceeds to step S805 similarly to subsequent steps to step S804 since the image forming apparatus 1 is in the standby state like in step S804.

In step S805, if the original detection sensor 202 detects an original (NO in step S805), the processing returns to step S802, and it is determined whether there is a job. In step S805, if the original detection sensor 202 does not detect an original (Yes in step S805), the processing proceeds to step S806. In step S806, the pressing-plate opening/closing sensor 303 determines whether the ADF 200 is opened from the platen glass 301. In step S806, if the pressing-plate opening/closing sensor 303 detects that the ADF 200 is opened from the platen glass 301 (NO in step S806), the processing returns to step S802, and it is determined whether there is a job.

In step S807, if the pressing-plate opening/closing sensor 303 detects that the ADF 200 is closed relative to the platen glass 301 (Yes in step S806), the processing proceeds to step S807.

In step S807, a wait time period starts to be measured. The wait time period is used to determine whether a TRIM command can be issued. If the wait time period starts to be measured, the processing proceeds to step S808. If the original detection sensor 202 detects an original (Yes in step S808), the wait time period stops being measured in step S809, and the processing returns to step S802. In step S808, if the original detection sensor 202 does not detect an original (NO in step S808), the pressing-plate opening/closing sensor 303 determines in step S810 whether the ADF 200 is opened or closed.

In step S810, if the pressing-plate opening/closing sensor 303 detects that the ADF 200 is opened from the platen glass 301 (Yes in step S810), the wait time period stops being measured in step S809, and the processing returns to step S802.

If the pressing-plate opening/closing sensor 303 detects that the ADF 200 is closed (NO in step S810), the processing proceeds to step S811, and it is determined whether the measured wait time period exceeds a specified time period (predetermined time period) (e.g., 30 seconds in the present exemplary embodiment). If the measured wait time period does not exceed the specified time period (NO in step S811), the processing returns to step S808, and results of the original detection sensor 202 and the pressing-plate opening/closing sensor 303 are checked again. If the measured wait time period exceeds the specified time period (Yes in step S811), the wait time period stops being measured in step S812, and the sub-process S701 ends.

The specified time period of step S811 in the above sub-flowchart needs to be longer than an estimated time period required for a user to perform another job again after a job in step S803 is completed. For example, if the specified time period is short enough (e.g., three seconds), even if an original that has been scanned is loaded onto the ADF 200 again and a copy operation is to be executed after a job in step S803 is completed, the job is not executed since the image forming apparatus 1 starts TRIM.

Referring back to FIG. 7, if in sub-process S701, it is determined that the image forming apparatus 1 is in the standby state, and the image forming apparatus 1 is in a user non-operation time period, the processing proceeds to step S702 and the subsequent steps, and a TRIM operation for the storage device 104 is started.

In step S702, it is determined whether a set sleep time that has been predetermined for the image forming apparatus 1 has come. If the set sleep time has come (Yes in step S702), the TRIM after step S702 is not executed, the processing proceeds to step S705. In step S705, the image forming apparatus 1 shifts to a sleep state. If the set sleep time has not come (NO in step S702), the processing proceeds to step S703.

In step S703, by referring to the storage area management table 408, it is determined whether the storage device 104 has a storage area where TRIM has not been completed. If the storage device has no storage area where TRIM has not been completed (NO in step S703), the processing proceeds to step S704, the image forming apparatus 1 waits until the set sleep time comes, and then the processing proceeds to step S705. In step S705, the image forming apparatus 1 is shifted to the sleep state. Here, as a condition under which the image forming apparatus 1 is shifted to the sleep mode, it is determined whether a set sleep time that has been predetermined has come. For example, however, a wait time period does not stop being measured in step S812. If the wait time period that continues to be measured exceeds a specified time period that is longer than and is different from the specified time period in step S811, the image forming apparatus 1 may shift to the sleep state. Alternatively, after a wait time period has been completed to be measured in step S812, another wait time period may start to be measured. Alternatively, if an operation instruction that shifts the image forming apparatus 1 to the sleep mode is received from a user, the image forming apparatus may shift to the sleep state.

Then the sleep state continues until a sleep return factor is detected in step S706. If a sleep return factor is detected (Yes in step S706), the processing returns to step S701, and the image forming apparatus 1 shifts to the standby state.

Referring back to step S703, if storage areas where TRIM has not been completed exist (Yes in step S703), the processing proceeds to step S707, and steps that execute a TRIM operation for the storage device 104 are executed.

In step S707, one of the storage areas of the storage device 104 where TRIM has not been completed is selected. In step S708, a TRIM command for the selected storage area is executed.

In step S709, if the original detection sensor 202 does not determine that an original is loaded onto the ADF 200 during execution of the TRIM (Yes in step S709), the processing proceeds to step S710. In step S709, if the original detection sensor 202 determines that an original is loaded onto the ADF 200 (NO in step S709), the processing proceeds to step S712.

If the pressing-plate opening/closing sensor 303 does not determine that the ADF 200 is opened (Yes in step S710), the processing proceeds to step S711. In step S711, the TRIM operation for the selected storage area is ended, and a TRIM execution flag of the storage area is switched LOW in the storage area management table 408. Then the processing returns to step S702. If the pressing-plate opening/closing sensor 303 determines that the ADF 200 is opened (NO in step S710), the processing proceeds to step S712.

In step S712, the TRIM for the storage area selected in step S707 is completed, and a TRIM execution flag of the storage area is switched LOW in the storage area management table 408. Then TRIM commands for the storage device 104 stop being issued thereafter, the processing returns to step S701, and the image forming apparatus 1 shifts to the standby state.

In step S708, the OS 401 issues a TRIM command for a storage area. Then, a TRIM operation is completed in the storage device 104, and the storage device 104 transmits to the OS 401 an acknowledgement signal that represents the completion of the TRIM. When the acknowledgement signal that represents the completion of the TRIM is received, it is determined in steps S711 and S712 that the TRIM operation for the selected storage area is completed.

There is no restriction on an order of steps S709 and S710. In response to a change detected by the original detection sensor 202 or the pressing-plate opening/closing sensor 303, TRIM may be interrupted if TRIM for a selected storage area is completed, and then the image forming apparatus 1 may return to the standby state in step S701. Alternatively, after TRIM for a selected storage area is completed in step S711 or S712, a change in each of the sensors described in steps S709 and S710 may be checked.

A satisfactory drawing performance may not be obtained during execution of TRIM since drawing signals controlled by the display-unit controller 106 use data stored in the storage device 104. Thus, it is preferable that the display unit 107 is caused not to display anything by turning off a backlight, and thus a user can recognize that the image forming apparatus 1 does not receive operation. Alternatively, it is preferable that a user is notified that TRIM is being executed.

The details will be described with reference to FIGS. 9A to 9D. FIGS. 9A to 9D are examples of displays displayed by the display unit 107 of the image forming apparatus 1 that is executing a TRIM command. When TRIM is executed with a TRIM command, a time period necessary to complete the TRIM command varies depending on capacity values of divided storage areas within the storage device 104 and a data storage status of a storage area within the storage device 104. For example, an example in which the original detection sensor 202 or the pressing-plate opening/closing sensor 303 detects user operation when it is several microseconds to complete a TRIM command for one storage area will be described.

In this case, a time period in which a user cannot operate the image forming apparatus 1 due to the occupation of the CPU 101 is short enough. The TRIM does not make the user wrongly think that the image forming apparatus 1 malfunctions. However, it may be several seconds left to complete a TRIM command at a time when user operation is detected. In this case, a user may wrongly think that the image forming apparatus 1 malfunctions. To solve the issue, a user needs to be notified using the display unit 107 that TRIM is being executed, as illustrated in FIGS. 9A to 9D.

An example in FIGS. 9A and 9B and an example in FIGS. 9C and 9D will be described as examples of methods of notifying a user that TRIM is being executed.

Figure 9A:
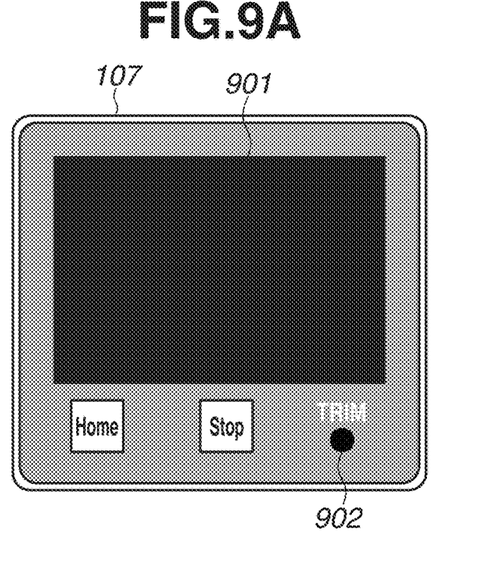
FIGS. 9A to 9D are examples of displays displayed by a display unit of the image forming apparatus that is executing a TRIM command.
Figure 9B:
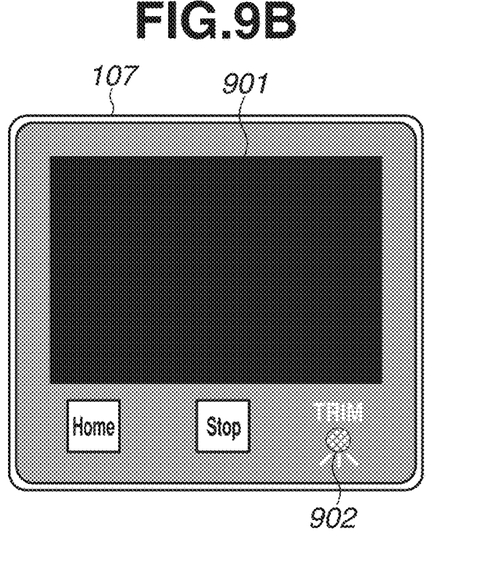

In FIGS. 9A and 9B, the display unit 107 includes an LCD 901 for display, and a light emitting diode (LED) 902 for notification of TRIM. While a TRIM command that starts from step S707 is executed, the LCD 901 and the LED 902 are turned off as illustrated in FIG. 9A. However, if a user operation is detected in step S709 or S710, the LED 902 is turned on as illustrated in FIG. 9B while the TRIM operation is interrupted, and the image forming apparatus 1 shifts to the standby state in step S712. Since the LED 902 is turned on, a user can understand that the LCD 901 is turned off due to the TRIM operation. The user does not wrongly think that the image forming apparatus 1 malfunctions even if the LCD 901 takes a time to be turned on.

Figure 9C:
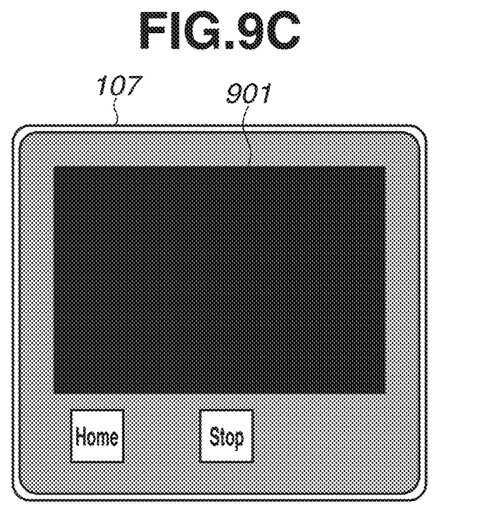
Figure 9D:
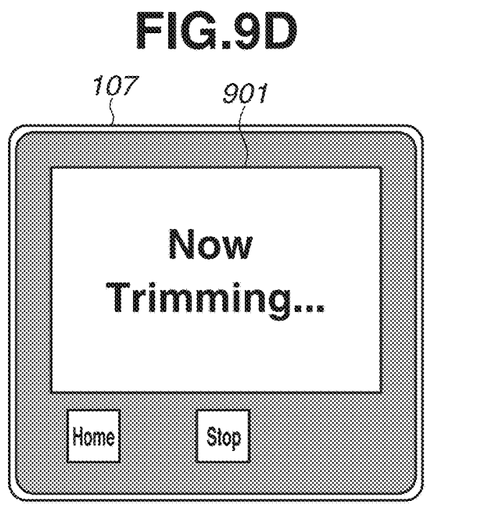

In FIGS. 9C and 9D, the display unit 107 only includes an LCD 901. While a TRIM command that starts from step S707 is executed, the LCD 901 is turned off as illustrated in FIG. 9C. Before TRIM is started, the display-unit controller 106 preliminarily displays on the LCD 901 a display screen that shows that TRIM is being executed. The display screen that shows that TRIM is being executed is not illustrated. However, a backlight of the LCD 901 is turned off when the TRIM is started. Accordingly, a user cannot see the information drawn on the LCD 901.

After the above preparations are made, if a user operation is detected in step S709 or S710, the backlight of the LCD 901 is turned on while the TRIM operation is interrupted, and the image forming apparatus 1 shifts to the standby state in step S712. With this operation, a user can see a display screen that has been drawn on the LCD 901 and shows that TRIM is being executed as illustrated in FIG. 9D. As described above, since a user sees the display screen that has been drawn on the LCD 901 to show that TRIM is being executed, the user does not wrongly think that the image forming apparatus 1 malfunctions even if a screen of the LCD 901 takes a time to switch to graphic information of the standby state.

The methods of notifying that TRIM is being executed in FIGS. 9A to 9D are just examples and are not limitative. For example, in the present exemplary embodiment, notification as illustrated in FIGS. 9B and 9D is executed only if a user operation is detected during execution of TRIM. However, notification can always be executed during execution of TRIM.

The configuration of the present exemplary embodiment allows TRIM to be interrupted if a user loads an original onto the ADF 200 or the reading unit 300. Therefore, TRIM is less likely to decrease operability of the image forming apparatus 1. Consequently, Trim processing is executed for each of the storage areas of the storage device 104 while performance is least influenced when a user performs operation. Thus, performance of the storage device 104 less deteriorates.

The present exemplary embodiment shows an example in which a TRIM operation is not executed in the sleep mode to decrease operations of the CPU 101. However, a TRIM operation is limited only to restrict increase in power consumption of the image forming apparatus 1 in the sleep mode. Therefore, a TRIM operation may be executed in the sleep mode. In the present exemplary embodiment, it is important to execute a TRIM operation in a time period that does not influence job operations and user operations. Therefore, it is not limited to whether a TRIM operation is to be executed in a standby mode and a sleep mode for power consumption.

Other Exemplary Embodiments

The disclosure has been described above with reference to the various examples and the exemplary embodiments of the disclosure. However, the gist and scope of the disclosure are not limited by particular descriptions in the present specification.

Programs that provide at least one function of the above exemplary embodiments may be supplied to a system or a device through a network or a storage medium. The aspect of the embodiments may be implemented as processing by at least one processor of a computer of the system or the device reading and executing the programs.

Alternatively, the aspect of the embodiments may be implemented as a circuit that provides at least one function (e.g., application-specific integrated circuit (ASIC)).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-220763, filed Dec. 5, 2019, which is hereby incorporated by reference herein in its entirety.

What is claimed is:

1. An image forming apparatus comprising:
   an object configured to detect an operation performed by a user;
   a nonvolatile storage that manages a semiconductor area, with the semiconductor area divided into a plurality of areas; and
   a controller capable of executing notification processing of notifying the storage of an areas where data having become unnecessary is stored among data stored in the semiconductor area,
   wherein the controller is configured to, in response to passing of a predetermined time period while the image forming apparatus is in a standby state, execute the notification processing on the plurality of areas divided out of the semiconductor area, and
   wherein the controller is configured to stop the notification processing based on detecting the operation by the object while the notification processing is executed.

2. The image forming apparatus according to claim 1, wherein the controller is configured to stop the notification processing by completing the notification processing on a divided area on which the notification processing is being executed among the plurality of divided areas, and by not executing the notification processing on a divided area on which the notification processing has not been executed among the plurality of divided areas.

3. The image forming apparatus according to claim 2, wherein the controller is configured to execute the notification processing on the divided area on which the notification processing has not been executed among the plurality of divided areas in response to passing of the predetermined time period from the stop of the notification processing while the image forming apparatus is in the standby state.

4. The image forming apparatus according to claim 2,
   wherein the controller is configured to manage information indicating that the notification processing is required for each of the plurality of divided areas, and
   wherein the controller is configured to execute the notification processing based on the managed information, in response to passing of the predetermined time period while the image forming apparatus is in the standby state.

5. The image forming apparatus according to claim 2,
   wherein the controller is configured to determine whether the plurality of divided areas includes a divided area on which the notification processing has not been executed among the divided areas, and
   wherein if the plurality of divided areas does not include the divided area on which the notification processing has not been executed, the image forming apparatus is configured to shift to a sleep state, in which power consumption is smaller than that in the standby state, if a predetermined condition is satisfied.

6. The image forming apparatus according to claim 1, wherein the controller is configured to sequentially execute the notification processing on the plurality of divided areas.

7. The image forming apparatus according to claim 1, wherein the standby state is a state in which the image forming apparatus can execute a job.

8. The image forming apparatus according to claim 1, further comprising a display that includes a screen,
   wherein when the notification processing is started, the display is configured to display, on the screen, a screen that indicates that the notification processing is being executed.

9. The image forming apparatus according to claim 1, further comprising a display that includes a screen,
   wherein the controller is configured to execute the notification processing and a display on the screen is configured to be turned off in response to passing of the predetermined time period while the image forming apparatus is in the standby state.

10. A method of controlling an image forming apparatus that includes an object configured to detect an operation performed by a user, a nonvolatile storage that manages a semiconductor area, with the semiconductor area divided into a plurality of areas, the method comprising:
    causing a controller to execute notification processing of notifying the storage of an areas where data having become unnecessary is stored among data stored in the semiconductor area;
    causing the controller to, in response to passing of a predetermined time period while the image forming apparatus is in a standby state, execute the notification processing on the plurality of areas divided out of the semiconductor area; and
    causing the controller to stop the notification processing based on detecting the operation by the object while the notification processing is executed.

11. The method according to claim 10, wherein
    the object is a sensor configured to detect that an original is placed by the user.

12. The method according to claim 10, wherein
    the notification processing is Trim processing.

13. The method according to claim 10, further comprising:
    causing the controller to stop the notification processing by completing the notification processing on a divided area on which the notification processing is being executed among the plurality of divided areas, and by not executing the notification processing on a divided area on which the notification processing has not been executed among the plurality of divided areas.

14. The method according to claim 13, further comprising:
    causing the controller to execute the notification processing on the divided area on which the notification processing has not been executed among the plurality of divided areas in response to passing of the predetermined time period from the stop of the notification processing while the image forming apparatus is in the standby state.

15. The method according to claim 13, further comprising:
   causing the controller to manage information indicating that the notification processing is required for each of the plurality of divided areas; and
   causing the controller to execute the notification processing based on the managed information, in response to passing of the predetermined time period while the image forming apparatus is in the standby state.

16. The method according to claim 13, further comprising:
   causing the controller to determine whether the plurality of divided areas includes a divided area on which the notification processing has not been executed among the divided areas; and
   causing the controller, if the plurality of divided areas does not include the divided area on which the notification processing has not been executed, to shift to a sleep state, in which power consumption is smaller than that in the standby state, if a predetermined condition is satisfied.

17. The method according to claim 10, further comprising:
   causing the controller to sequentially execute the notification processing on the plurality of divided areas.

18. The image forming apparatus according to claim 1, wherein
   the notification processing is Trim processing.

19. The image forming apparatus according to claim 1, wherein
   the object is a sensor configured to detect that an original is placed by the user.

20. The image forming apparatus according to claim 1, further comprising:
   a platen glass on which an original is placed;
   a pressing member configured to press the original against the platen glass;
   wherein the object is a sensor configured to detect that the pressing member is released away from the platen glass by the user.

* * * * *